US008442887B2

(12) United States Patent
Hamann

(10) Patent No.: US 8,442,887 B2
(45) Date of Patent: May 14, 2013

(54) METHOD AND SYSTEM FOR PROVIDING SERVICES TO VACATION HOMEOWNERS

(76) Inventor: Dennis C. Hamann, Mendham, NJ (US)

( * ) Notice: Subject to any disclaimer, the term of this patent is extended or adjusted under 35 U.S.C. 154(b) by 0 days.

(21) Appl. No.: 13/592,703

(22) Filed: Aug. 23, 2012

(65) Prior Publication Data
US 2013/0054276 A1 Feb. 28, 2013

Related U.S. Application Data

(60) Provisional application No. 61/526,378, filed on Aug. 23, 2011.

(51) Int. Cl.
*G06Q 40/00* (2006.01)
(52) U.S. Cl.
USPC .................................................. 705/35; 705/4
(58) Field of Classification Search ........... 705/4, 35–40
See application file for complete search history.

(56) References Cited

U.S. PATENT DOCUMENTS

| 7,516,099 | B2 * | 4/2009 | Schneider | 705/38 |
| 7,689,494 | B2 * | 3/2010 | Torre et al. | 705/36 R |
| 2011/0276507 | A1 * | 11/2011 | O'Malley | 705/321 |

* cited by examiner

*Primary Examiner* — Thu Thao Havan
(74) *Attorney, Agent, or Firm* — Sheridan Ross P.C.

(57) ABSTRACT

A method and system for providing services to vacation homeowners facilitates the cost-effective administration of a variety of services required by vacation homeowners in a fashion that frees the homeowner from undue expense, time or effort. In one embodiment the method includes: setting up a real estate property on a system via capturing by a computer processor a complete image inventory of the property, creating a unique CRM record along with detailed information on the property; provisioning a new user account formatted into an online, user-accessible, self-care portal; conducting predetermined inspections of the property; assigning each property a unique identifier to ensure high quality case management of the property; tracking the inspections using the identifier; providing automatic alerts to the property owner at the initiation of specific workflow steps; providing alerts and updates; and measuring ongoing customer satisfaction by prompting for specific feedback.

12 Claims, 4 Drawing Sheets

| | |
|---|---|
| Value of Home: | $1M - 1.49M ▼ |
| Age of Home: | 2 - 5 years ▼ |
| Closest Metropolitan City: | Phoenix ▼ |
| Square Footage: | > 5000 sq ft ▼ |
| Lot Size: | 0.50 - 0.99 ▼ |
| Percentage of Lot Landscaped: | 25 - 50% ▼ |
| Special Amenities: | Pool & Hot Tub ▼ |
| Monthly HOA Fees: | $ |
| Value of Your Time Per Hour: | $ |

Your Email Address:

METHOD AND SYSTEM FOR PROVIDING SERVICES TO VACATION HOMEOWNERS

RELATED APPLICATION

This application claims priority from U.S. Provisional Patent Application Ser. No. 61/526,378 filed on Aug. 23, 2011. The entire disclosure of the prior application is considered to be part of the disclosure of the accompanying application and is hereby incorporated by reference.

FIELD OF THE INVENTION

The present invention is directed to a method and system for providing services to vacation homeowners, and more particularly to a method and system that facilitates the cost-effective administration of a variety of services required by vacation homeowners in a fashion that frees the homeowner from undue expense, time or effort.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

Figure 2:
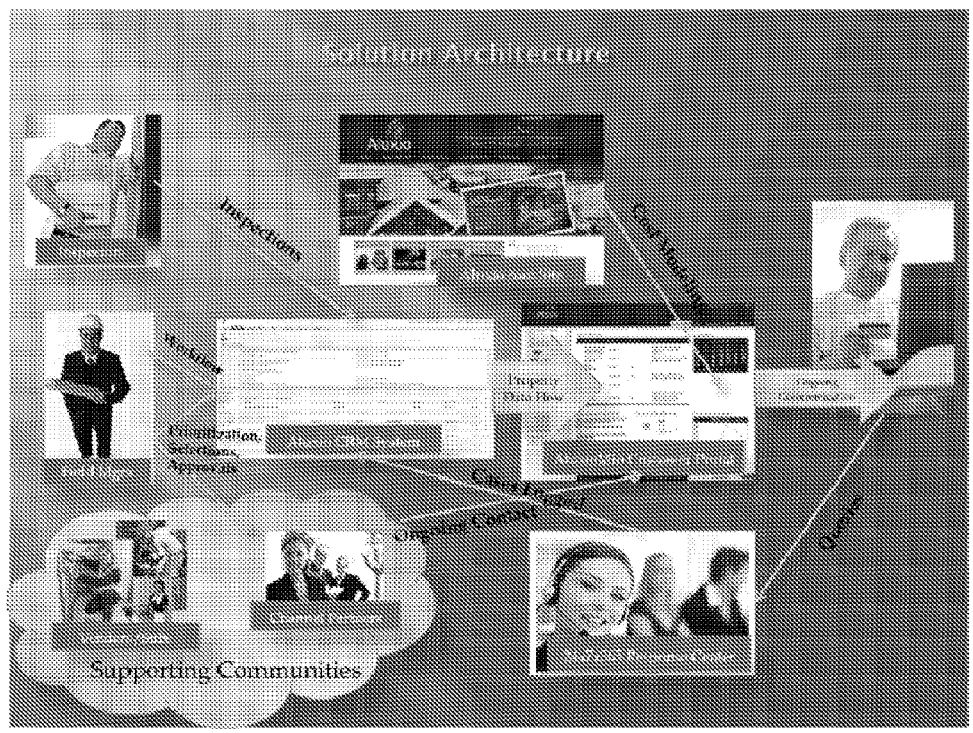

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

FIG. 1 illustrates an exemplary user interface according to one embodiment;

FIG. 2 illustrates an overall system architecture according to one embodiment;

Figure 3:
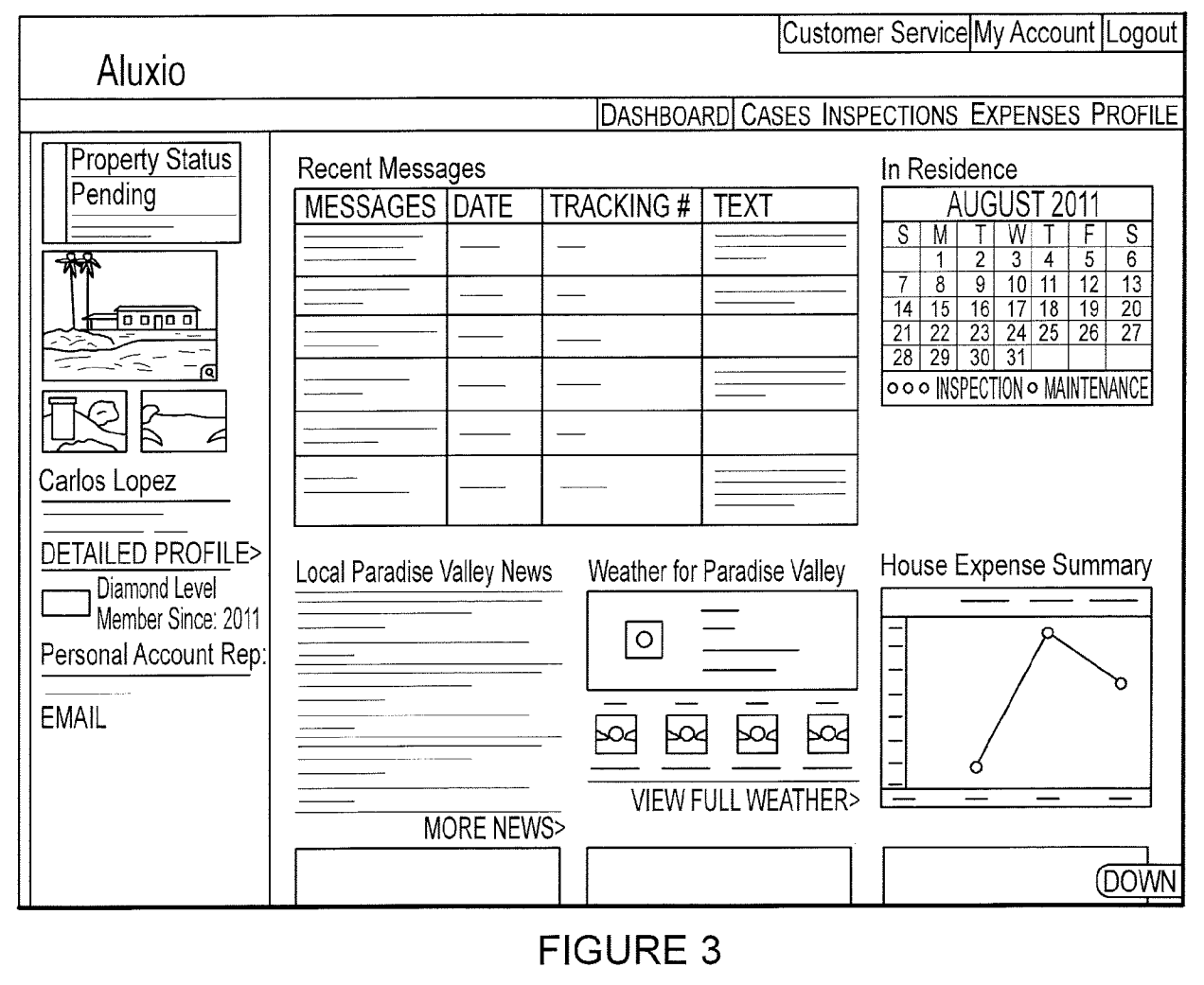

FIG. 3 illustrates an exemplary user interface according to one embodiment; and

Figure 4:
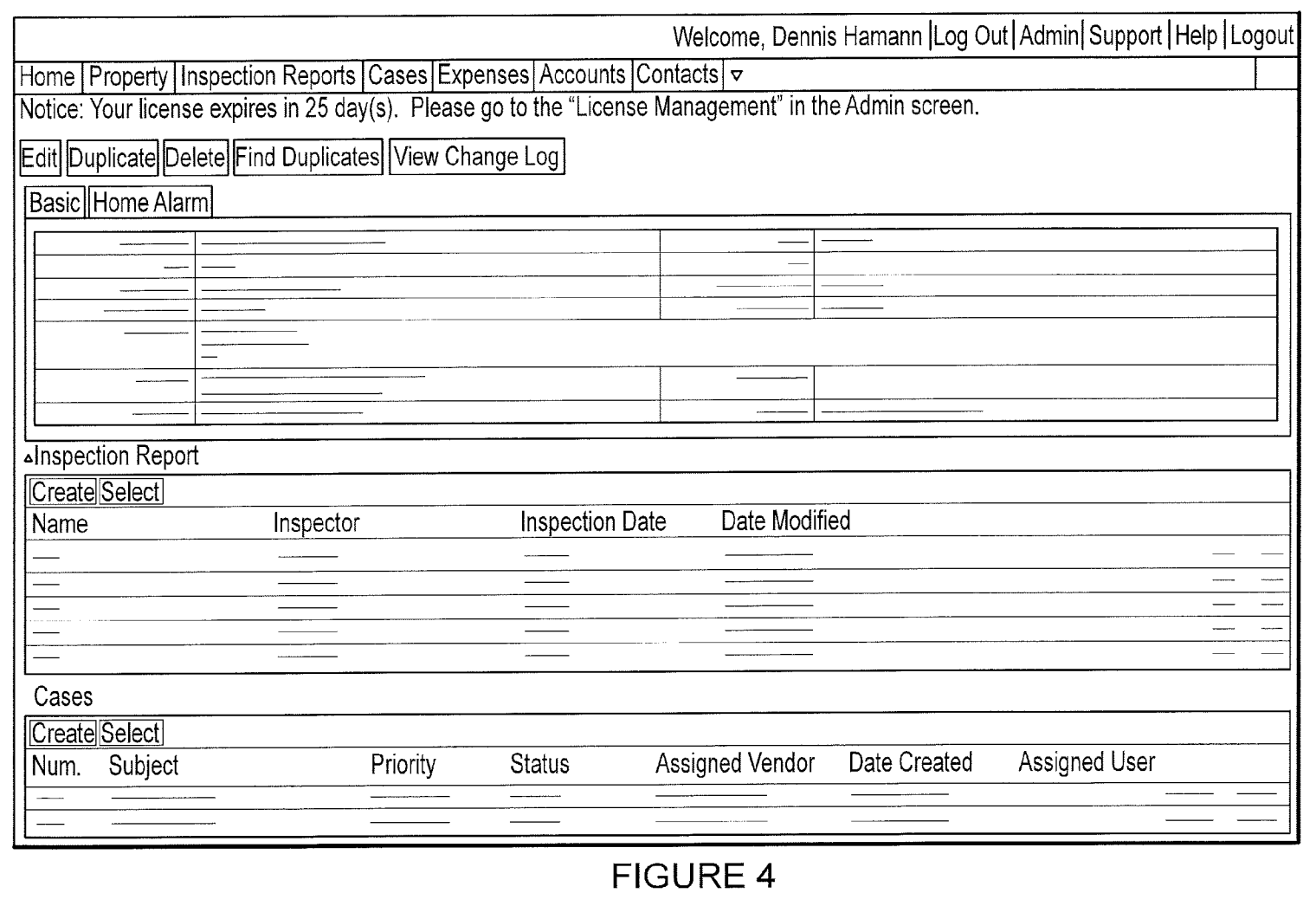

FIG. 4 illustrates an exemplary CRM database example according to one embodiment.

BACKGROUND AND SUMMARY OF THE INVENTION

The present invention emerged from frustrations over the lack of quality services available for remote owners of vacation homes. While there have been plenty of "property managers" focused on short term rentals as well as the odd "handyman" who would emerge to do some quick work and then disappear—leaving nothing but a vague (and often expensive) bill behind, the present state of affairs in the industry reveals an absence of a service provider that demonstrates a significant interest in addressing the overall, specific needs of the remote homeowner. Thus, one aspect of the present invention is directed to offering the scale and professionalism to apply a comprehensive, Total Cost of Ownership (TCO) approach to luxury homes in a manner that is totally aligned with those of the customers served. Various embodiments of the present invention are directed to providing personalized, high-quality oversight of luxury homes so that the owners can truly enjoy their time in the home. A complete range of services catering to the needs of the remote luxury homeowner is provided, with the focus being on the homeowner's unique needs, rather than on the needs or conveniences of maintenance contractors, service providers or potential tenants. Such exceptional, premium service is provided both in person and/or online.

The range of options and services comprise:

Complete Maintenance and Repair Programs. Regardless of location—whether the owner is in Scottsdale, Ariz., Breckenridge, Colo., or Fort Myers, Fla., one objective of the present invention is to administer and be cognizant of seasonal demands with the finest attention to detail in a fashion such that the owner is provided with the ability to source and manage relationships with a range of the leading service providers in desired areas in order to provide the best value and obtain optimal results for the owner.

Concierge Services to provide customized services to put the "vacation" back into vacation home ownership.

Flexible and Comprehensive Billing that offers a single point of contact in managing the billing and account reconciliation for all of the service providers in a manner that saves homeowners a huge amount of time, but takes advantage of the leverage afforded by a central agency that consolidates accounts to permit substantial savings.

Reports, Documentation, and Oversight are provided so that the homeowner receives detailed regular reporting on the status of their home and comprehensive information on any issues which need to be addressed. This eliminates undesired surprises or large expenses without representation on the homeowner's behalf and an accurate assessment of the repairs and services required.

In certain embodiments, an inspection checklist is provided that is assessed and confirmed at predetermined intervals, preferably via internet communications. Such services and checklist items include: flushed all toilets; ran water in all sinks; checked under all sinks for leaks; turned vales off for washing machines; checked all doors and windows; returned trash cans to house; set thermostat temperature; walked around house and advised any upkeep or maintenance; pets present and healthy; inspected refrigerator and freezer; put water heater into vacation setting; picked up newspapers; and adjust temperature appropriately.

The amount of time and money spent to annually manage and maintain vacation home is shown to be far more than one might appreciate. Repairs and basic maintenance alone can cost between 1% to 3% of the value of a home each year—and that doesn't account for special home features, services, and inefficiencies due to the homeowner not being present locally and able to dedicate the time to stay on top of matters. With respect to utilities, there are significant issues relating to whether a homeowner is getting the best value with those utility providers. The time and effort expended by homeowners on areas outside of their expertise is significant, and even those somewhat sophisticated in certain matters, find that they personally spend substantial time and resources on finding service providers, obtaining quotes, authorizing the work, waiting for repair personnel, and then, ultimately, paying the bills. These are often the "hidden costs" of vacation home ownership that not only affect the true cost of ownership but detract from the entire experience of enjoying a luxury vacation property.

Certain patents and patent publications are incorporated herein by this reference to provide additional support with respect to written description and enablement requirements, including the following: 20080262879 to Furlong; 2002/0143154; 2006/0129438; U.S. Pat. No. 6,778,193 to Beringertiamer; Ser. No. 11/313,138 to Epstein; 20060282275 to Pineda; 20100217686 to Craig; 20110167007 to Saitta; 20110184782 to Delany; 20110161343 to Schimpf et al.; 20110145805 to Taylor et al.; and U.S. Pat. No. 7,395,552 to Taylor et al.

One aspect of the present invention is directed to understanding a homeowner's particular situation utilizing, for example, a "Cost Modeling Tool" so as to get a basic understanding of the costs and time involved in managing a property; trained, local personnel representing the homeowner's interests; 24 hour×7 day×365 days/year back-end support; and full access to personalized information via web and mobile.

Oversight & Reporting

Through regularly-scheduled home visits, the present invention provides highly-qualified staff that stays on top of the condition of a homeowner's property. Prompt intervention occurs when necessary to protect the homeowner's interests and detailed reports are generated to keep the homeowner informed.

Complete Maintenance Programs

From pools to patios, landscaping to painting, heating/air-con to cleaning services, the present invention in various embodiments is adapted to setup and manage all of the maintenance needs of the homeowner's home. Preferably, the administering agent or agency works for the homeowner directly and the homeowner is not just directed to deal separately with contractors—with the agency thus making sure costs are competitive and quality levels remain high.

Flexible Billing & Concierge Services

One aspect of the invention is directed to the direct management of all suppliers involved as well as provide a full slate of customized concierge services.

The advantages provided by the present invention include the following:

Provide a valuable high-end service to buyers/owners of luxury properties

Better management of property to avoid/minimize HOA infringements and issues

Sample services are selected from the group consisting of:
  Landscape and grounds maintenance
  House cleaning
  Pest removal and maintenance programs
  Critical repair assessment and intervention
  Pool, hot tub and sauna servicing
  Snow removal
  Home security concerns—lighting, alarm systems and coordination with professional home-security companies and associations
  Homeowner's Association interaction and representation
  Bill consolidation and account reconciliation In various embodiments, the homeowner is provided with a set of solutions to meet individual needs based upon the frequency and extent of services required. These can range from simple, monthly oversight visits designed to monitor the vendors chosen, to a complete preventive maintenance programs with full management of vendors and integrated billing services. The particular tailored packages of services can be designed to provide a specific program to meet a homeowner's predetermined needs and that are of appropriate desired scale to provide true value at an affordable price.

In various embodiments of the invention, the capabilities listed below are made available via a system that employs a computer processor:

Share information with contacts via Facebook, Linked-In, Twitter

Objective: Create stickiness, customer loyalty, premium service experience

Access inspection reports

Track/monitor expenses under management and account status

Store image inventory of key assets

Local weather, news, announcements

Additional relevant communications—e.g. homeowner's newsletters, etc

Contact account manager(s)

Track status of issues, inquiries

TCO (total cost of ownership) forecasting and reporting tool

FIG. 1 illustrates an exemplary user interface according to one embodiment.

FIG. 2 illustrates an overall system architecture according to one embodiment.

In one embodiment, the following solution delivery process elements are employed, with the method including at least five of the following steps:

a. Setting up a real estate property on a system via capturing a complete image inventory of the structure, grounds, amenities, furnishings, and high value assets of such property. In a preferred embodiment, a setup also includes complete logging of current vendors used for various services and audits those vendors for price competitiveness and quality performance.

b. Configuring solution for ongoing capture and reporting of events relating to the property. This includes creating a unique CRM record along with detailed information on property, uploads of all image files, applicable service providers, and ongoing expense categories. (see FIG. 2 for overview of solution architecture)

c. Provisioning a new user account formatted into an online, user-accessible, self-care portal (see FIG. 3) with a secure, unique username and password that allows the homeowner to view, delve into, and interact with the service provider (such as Aluxio, LLC) on data collected and information processed related to the owner's vacation home.

d. Conducting predetermined, e.g. weekly, daily, etc. inspections of the property. Inspections are preferably a strict structured process to ensure consistency of both oversight quality and data captured. Inspections are uploaded into system, subsequently approved by a Field Manager, and then posted for viewing online by remote homeowners.

e. Initiating "Cases" for any issues or requests related to the subject property. Each case is assigned a unique identifier and is channeled through a consistent workflow that assures case management of the highest quality in the most effective time.

f. Tracking of all cases and inspections with applicable information (including images relating to specific issues/requests) being logged and available online.

g. Providing automatic alerts to homeowner at the initiation of specific workflow steps such as account setup, inspection complete, case opened, approval required, case closed, etc. Alerts provide timely updates and drive clients to self-care portal for more information.

h. Measuring ongoing customer satisfaction by prompting for specific feedback and acquiring standard CSAT (customer satisfaction on a Likert scale of 1-5) and NPS (Net promoter score on a Likert scale of 1-5) data for ongoing customer engagement and structuring of service employee incentive programs.

i. Reporting of Vacation Home Costs via the self-care Portal for homeowner general information, scrutiny, and comparison purposes versus planned, market-competitive indices.

j. Enhanced Modeling and Forecasting of Vacation Home costs which are used to benchmark service provider competitiveness and provide forecasts for ongoing management of planned versus actual costs.

k. Creating scale expansion of service delivery model via standardization of systems and processes such that the model may be repeatedly setup with internal resources deployed in subsequent markets, franchised and/or sub-licensed to other parties for business expansion.

l. Implementing data-mining and business intelligence functionality to further gather and process self-care portal user data and behavior trends to further identify product/service up-sell opportunities and aggregate data re-sale opportunities to target partners.

FIG. 3 illustrates an exemplary user interface according to one embodiment. More specifically, a self-care portal design for new homeowners.

Other aspects of particular embodiments include so-called Service Provider Recruitment and Management Process Elements, selected form the following:

1. Conducting local market analysis to find price-competitive, superior-performing service providers across a service provider's (e.g. Aluxio's) targeted service provider categories including: home security; pest removal; lawn and garden maintenance; pool and hot tub maintenance; household cleaning services; general maintenance and repair services; audio-visual systems; HVAC systems; interior design services; window cleaning services; tree & shrub trimming services; interior and exterior painting services; plumbing services; transportation services; event planning services; internet services; etc. Sources of information to compile, edit, and evolve prioritized lists of service providers include public internet ratings, personal recommendations, client experiences, etc.; and 2. Executing partnership agreements with targeted service providers that ensures skill competency, adequate insurance coverage, and provides incentives for both parties to cross-market and grow each Parties' business; and 3. Assigning selected service providers to targeted accounts and projects according to general overall ratings and homeowner unique needs 4. Monitoring performance of service providers against local industry pricing and norms for performance 5. Implementing standard processes in project initiation, updates, and completion and ensuring compliance of service providers with that methodology.

6. Assessing service provider performance on each account/project undertaken for ongoing performance monitoring and improvement purposes.

7. Conducting regular performance audits on service providers to ensure ongoing consistent performance and compliance with business relationship principles.

8. Ongoing editing and evolution of service provider community involvement and prioritization as part of the service provider's (i.e. Aluxio) ecosystem.

In still other embodiments, the following Channel Marketing Process Elements are included, such elements including:

a. Identifying and target key channel partners which service the needs of the remote luxury homeowner in the targeted market. Targeted channel partners to include: real estate brokers/agents; title companies; property and casualty insurance agents/brokers; luxury home builders; wealth management firms; homeowners associations; etc.

b. Executing partnership agreements with targeted channel partners that ensures proper positioning of service, customer satisfaction focus, and provides incentives for both parties to cross-market and grow each Parties' business c. Instilling a complementary client identification, qualification, and closing process to maximize effectiveness of joint marketing efforts to a targeted client base.

d. Offering an ongoing channel partners communication area as part of the self-care portal that facilitates ongoing communication between channel partners and the clients which have been converted into the service provider's (i.e., Aluxio's) clients.

e. Measuring, evolving and optimizing channel relationships and strategies to increase effectiveness according to statistics surrounding customer acquisition costs and overall customer value.

In one embodiment, that includes the above mentioned solution delivery process elements; Channel Marketing Process Elements; and Service Provider Recruitment and Management Process Elements, a method is provided for the storage of customized content in a computer-based system having a client and an application system and with a database containing a plurality of pieces of information, and one or more modules that access the database to pull pieces of information from the database based on a request from the client and display a user interface to the user containing the requested information. One or more controllers can be used to control access by the client to the one or more modules and the database. In certain embodiments the method comprises storing a template for a customized piece of content in the database wherein the customized piece of content includes the template and customized data. The customized data for each property owner may be stored in the database; and a customized piece of content can then be generated for each property owner based on the template and/or customized data, enabling avoidance of storing actual customized content for each property owner. Such data may comprise email messages. Preferably the method also employs a data gathering unit that gathers a set of deployment information about the deployment on the particular computing device. An aggregation computer coupled to computing devices can also be used that receives a set of deployment information from the computing device or storage unit. The aggregation computer preferably automatically provides an update to the deployment on the computing device. Selected from the group of a status of the deployment, a set of information about the modules that are part of the deployment, a set of anonymous usage statistics, a set of non-anonymous usage statistics and a list of a set of elements of the deployment. Each deployment preferably includes a customer relationship management (CRM) application customized to consolidate salient information on properties and the relevant owners/suppliers of those properties—see example in FIG. 4. The set of elements of the deployment may further comprise a flavor of the deployment, a set of modules, themes, language packs and extensions of the deployment. To address written description and enablement issues, U.S. Pat. No. 7,941,798 to Taylor et al. is incorporated herein by this reference in its entirety.

FIG. 4 illustrates an exemplary CRM database example.

In one embodiment (with reference to FIG. 4), the system is implemented as a software system that may preferably use open source code, implemented as a plurality of lines of computer code that may be executed by a processor of a computer system, such as a server computer. The computer code may be stored in a memory associated with the computer system and the system interfaces with a database. A browser application can be used that accesses the system over a computer network such as the Internet and client interactions preferably go through a set of one or more controllers. The system preferably has one or more modules of a CRM system that include: a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. In certain embodiments, more than one modules provides several functionalities.

In certain embodiments, the user is shown a list of documents available for download. The user can also: upload documents, assign publish and expiration dates, and specify which users can access them; write and send emails; create Email Templates; save drafts and archive emails; implement and track marketing campaigns; create a prospects list; manage tasks related to specific projects; update the information for each task; view the latest headlines distributed or syndicated by web sites, etc.

A template mechanism may be used to reformat data from the database into a particular form and may be adjustable according to the user's preferences. An index controller can be employed that loads the current user, verifies authentication and session information, loads the language for the user and produces some of the UI shell and then calls the contact module and requests a detailed view for the specified contact. Thus in one embodiment, a method and apparatus is used for controlling access to an information related to a data access system and a security module that is adapted to modify team membership records to assign a member to a team assigned to a particular data item.

One will appreciate that this summary of the Invention is not intended to be all encompassing and that the scope of the invention nor its various embodiments, let alone the most important ones, are necessarily encompassed by the above description. One of skill in the art will appreciate that the entire disclosure, as well as the incorporated references, pictures, etc. will provide a basis for the scope of the present invention as it may be claimed now and in future applications.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

What is claimed is:

1. A method for providing personalized, high-quality oversight of a luxury homes property, comprising:
   a) setting up a real estate property on a computer system by capturing, using a computer processor an image inventory of the structure, grounds, amenities, furnishings, and high value assets of a luxury home property, said step of setting up including at least one of a logging of current vendors used for various services; and an auditing of vendors for price competitiveness and quality performance;
   b) creating a record related to the property that includes uploads of image files, applicable service providers, and ongoing expense categories;
   c) providing an online, user-accessible, portal with a secure username and password that allows an owner of the property to interact with a service provider based on information processed related to the property;
   d) conducting predetermined inspections of the property, wherein said inspections are performed in conformance with a structured process that includes evaluations of the record in a manner that ensures consistency of oversight quality and data captured and that results in a written inspection report being generated;
   e) uploading said inspection report into the system;
   f) posting said inspection report for viewing online by the property owner;
   g) assigning each property a unique identifier;
   h) tracking said inspection report using said unique identifier;
   i) providing at least one automatic alerts to the property owner at the initiation of one of a specific workflow steps selected from the group consisting of: account setup, inspection completed, case opened, approval required, and case closed;
   j) providing updates that employ said identifier;
   k) directing the property owner to the portal for additional information;
   l) measuring ongoing customer satisfaction by prompting for specific feedback and acquiring at least one of: a standard customer satisfaction on a Likert scale of 1-5; and a net promoter score on a Likert scale of 1-5;
   m) reporting costs via the portal using market-competitive indices;
   n) providing forecasts for ongoing management of at least one of planned and actual costs;
   o) creating a scale expansion of a service delivery model;
   p) implementing a data-mining functionality to process user data and behavior trends.

2. The method as set forth in claim 1, further comprising, conducting a local market analysis to find price-competitive, superior-performing service providers across a targeted service provider category selected from the group consisting of: home security; pest control and removal; lawn and garden maintenance; pool and hot tub maintenance; household cleaning services; general maintenance and repair services; audio-visual systems; HVAC systems; interior design services; window cleaning services; tree & shrub trimming services; interior and exterior painting services; plumbing services; transportation services; event planning services; garage door installation, repair, and servicing; and internet service.

3. The method as set forth in claim 1, further comprising compiling a prioritized list of service providers that include public internet ratings, personal recommendations, and client experiences.

4. The method as set forth in claim 1, further comprising executing partnership agreements with targeted service providers having a predetermined level of skill and insurance coverage.

5. The method as set forth in claim 1, further comprising monitoring performance of service providers against industry pricing and norms for performance.

6. The method as set forth in claim 1, further comprising implementing a standard process for project initiation, updates, and completion.

7. The method as set forth in claim 1, further comprising assessing service provider performance on each account.

8. The method as set forth in claim 1, further comprising conducting regular performance audits on service providers.

9. The method as set forth in claim 1, further comprising identifying a key channel partner that service the needs of a remote luxury homeowner in a targeted market, said key channel partner selected from the group consisting of: a real estate broker; a title company; a property and casualty insurance broker; a luxury home builder; a wealth management firm; and a homeowner's associations.

10. The method as set forth in claim 1, further comprising executing a partnership agreement with the key channel partner.

11. The method as set forth in claim 1, further comprising providing a client identification, qualification, and closing process to maximize effectiveness of joint marketing efforts to a targeted client base.

12. The method as set forth in claim 1, further comprising offering an ongoing channel partners communication area as part of the portal to facilitates communication between the key channel partner and the property owner.

* * * * *